US006691635B2

United States Patent
Murakami et al.

(10) Patent No.: US 6,691,635 B2
(45) Date of Patent: Feb. 17, 2004

(54) THRUST MEASUREMENT SYSTEM FOR SMALL PLANING WATERCRAFTS

(75) Inventors: Masatoshi Murakami, Hamamatsu (JP); Yasuo Torii, Hamamatsu (JP); Tomoyasu Katayama, Hamamatsu (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/462,438

(22) Filed: Jun. 16, 2003

(65) Prior Publication Data

US 2003/0230226 A1 Dec. 18, 2003

(30) Foreign Application Priority Data

Jun. 18, 2002 (JP) ........................................ 2002-176888

(51) Int. Cl.⁷ .............................................. B63B 21/00
(52) U.S. Cl. .................................. 114/230.1; 73/117.1
(58) Field of Search ......................... 114/230.1, 230.19, 114/230.24, 294; 73/116, 117.1, 167, 168, 826

(56) References Cited

U.S. PATENT DOCUMENTS

| 2,552,424 A | * | 5/1951 | Gorman .................... 114/230.1 |
| 2,907,294 A | * | 10/1959 | Lawler ..................... 114/230.1 |
| 3,081,731 A | * | 3/1963 | McEvoy ................... 114/230.1 |
| 3,109,304 A | * | 11/1963 | Hunziker .................... 73/117.1 |
| 3,240,056 A | * | 3/1966 | Read .......................... 73/117.1 |
| 3,487,426 A | * | 12/1969 | Hoffmann .................. 73/117.1 |
| 3,969,931 A | * | 7/1976 | Lanning ..................... 73/117.1 |
| 4,782,696 A | * | 11/1988 | Suchoza et al. ............. 73/168 |
| 4,864,956 A | * | 9/1989 | Onstwedder, Jr. ...... 114/230.24 |
| 6,000,356 A | * | 12/1999 | VanAssche et al. ...... 114/230.1 |
| 6,418,794 B1 | * | 7/2002 | Dubois et al. ................ 73/826 |
| 6,439,147 B2 | * | 8/2002 | Cottrell et al. ......... 114/230.19 |
| 6,439,149 B1 | * | 8/2002 | Hile .......................... 114/294 |
| 6,502,457 B1 | * | 1/2003 | Dubois et al. ................ 73/167 |

FOREIGN PATENT DOCUMENTS

JP          56-132246          2/1983

* cited by examiner

Primary Examiner—S. Joseph Morano
Assistant Examiner—Lars A. Olson
(74) Attorney, Agent, or Firm—Rankin, Hill, Porter & Clark LLP (57) ABSTRACT

A thrust measurement system includes a water pool for receiving therein a watercraft in a floating condition, a bow holding apparatus disposed on an edge portion of the water pool for holding a bow of the watercraft, a thrust measurement device mounted in the bow holding apparatus, and an anchoring device spanning between an edge of the water pool and a hull of the watercraft for anchoring the watercraft in position against swinging movement about the bow. In order to permit free rise and fall of the bow of the watercraft, the bow holding apparatus has a floating structure that can move freely in a vertical plane.

9 Claims, 8 Drawing Sheets

THRUST MEASUREMENT SYSTEM FOR SMALL PLANING WATERCRAFTS

FIELD OF THE INVENTION

The present invention relates to a thrust measurement system for small planing watercrafts, which is designed to measure the thrust of a small planing watercraft under the condition that the watercraft is received in a water pool in a floating condition.

BACKGROUND OF THE INVENTION

Japanese Patent Publication No. (SHO) 62-6173 discloses a method of measuring the thrust of a watercraft propulsion unit. The disclosed thrust measuring method, as illustrated here in FIG. 8, includes two strain gauge units 102, 102 attached by bonding to an inner surface 101a of a casing 101 of the propulsion unit 100 in such a manner that the strain gauge units 102, 102 are disposed in diametrically opposite relation to each other. Each strain gauge unit 102 has two strain gauge elements (not shown) which are connected with two strain gauge elements of another strain gauge unit 102 so as to form a bridge in a manner known per se.

Figure 8:
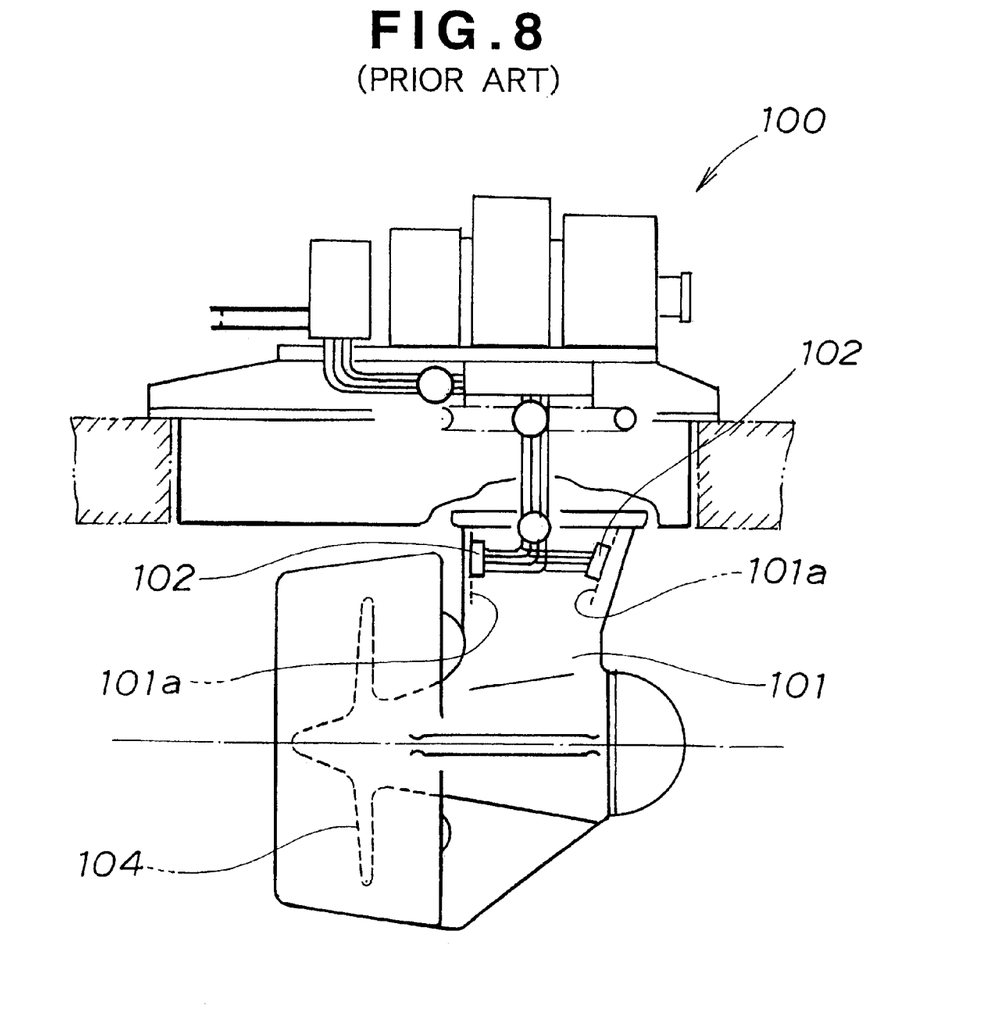
FIG. 8 is a diagrammatical side view showing a conventional thrust measurement method.

During thrust measurement operation, the propulsion unit 100 is driven to rotate a screw-propeller 104, and the amount of strain occurring in the casing 101 due to rotation of the screw-propeller 104 is measured by the bridge of the strain gauge elements. As is well known, there is a certain relationship established between the thrust of the propulsion unit 100 and the amount of strain of the casing 101. Accordingly, by thus measuring the amount of strain of the casing 101, a thrust of the propulsion unit 100 can be readily determined.

The conventional thrust measuring method discussed above is labor intensive because the strain gauge units 102. 102 must be attached to and removed from the casing 101 each time the thrust measurement for one propulsion unit 100 is achieved. Furthermore, the conventional thrust measuring method is limited for use with a propulsion unit alone that is not installed in the hull of a watercraft. There has been a desire to realize a thrust measurement system which is capable of measuring the thrust of a propulsion unit as it is installed in the watercraft.

It is, accordingly, an object of the present invention to provide a thrust measurement system for small planing watercrafts, which is labor-saving, easy to conduct and capable of measuring the thrust of a propulsion unit as it is installed in the hull of a watercraft.

SUMMARY OF THE INVENTION

According to the present invention, there is provided a thrust measurement system for watercrafts, comprising a water pool for receiving therein a watercraft in a floating condition, a bow holding apparatus disposed on an edge of the water pool for holding therein a bow of the watercraft during thrust measurement operation, a thrust measurement device mounted in the bow holding apparatus for measuring a thrust of the watercraft, and anchoring means spanning between the edge of the water pool and a hull of the watercraft for anchoring the watercraft in position against lateral swinging movement about the bow.

With the thrust measurement system thus arranged, the thrust of a propulsion unit used for propelling a watercraft can be measured under the condition that the propulsion unit is installed in the watercraft. This eliminates the need for a laborious manual operation which is employed in the conventional thrust measurement process of FIG. 8 for the purpose of attaching or detaching the strain gauge units relative to a casing of the propulsion unit.

In one preferred form of the present invention, the bow holding apparatus includes a plurality of support columns, a carrier member slidably mounted on the support columns for vertical movement along the support columns, the carrier member carrying thereon the thrust measurement device, a cylinder actuator for moving the carrier member upward or downward along the support columns, a slide member slidably mounted on the carrier member for horizontal reciprocating movement in a direction toward and away from the water pool, a bow holding mechanism for holding therein the bow of the watercraft, the bow holding mechanism being connected to the slide member and held in contact with a probe of the thrust measurement device, and a balancing device that counterbalances to the weights of the bow holding mechanism, thrust measurement device, slide member and carrier member such that the bow holding mechanism, thrust measurement device, slide member and carrier member together form a floating structure that can move freely in a vertical plane.

By virtue of the floating structure of the bow holding apparatus, the bow of the watercraft is allowed to freely move up and down as the watercraft moves to drift in synchronism with heaving of the pool water surface.

Preferably, the bow holding mechanism has a bow hold member having a recessed portion of a configuration snugly receptive of the bow of the watercraft, a vertically disposed thrust board connected to the slide member for movement in unison with the slide member and held in contact with the probe of the thrust measurement device such that a movement of the slide member in a direction away from the water pool causes the thrust board to push the probe of the thrust measurement device, and a ball joint articulately interconnecting the bow hold member and the thrust board. interconnecting the bow hold member and the thrust board.

With this articulate coupling using the ball joint, the bow hold member can take various postures relative to the thrust board, which may occur when the watercraft undergoes pitching, rolling, steering and accelerating.

The bow holding mechanism may further have a plurality of compression coil springs acting between the bow hold member and the thrust board and arranged at regular intervals around an axis of the ball joint. Furthermore, the bow holding mechanism may also have adjustable spring retainers each supporting one end of a respective one of the compression coil springs, the adjustable spring retainers being movably mounted on one of the bow hold member and the thrust board and separately movable in a direction to change a preload applied to the individual compression springs. Preferably, the adjustable spring retainers each comprise a stepped round bar having a thread-free small-diameter portion, a threaded large-diameter portion, and an annular flange separating the small-diameter portion and the large-diameter portion, the annular flange supporting thereon one end of each compression coil spring with the thread-free small-diameter portion received in an internal space of the compression coil spring, and the threaded large-diameter portion being threaded through an internally threaded portion of the thrust board. The bow hold member may have a plurality of recessed portions arranged around the axis of the ball joint and each receiving therein the opposite end of a respective one of the compression coil springs.

The anchoring means preferably comprises a first wire rope having one end connected to a first edge portion of the water pool and the other end adapted to be connected to a central portion of a stern of the watercraft, a second wire rope having one end connected to a second edge portion of the water pool diametrically opposite the first edge portion and the other end adapted to be connected to the central portion of the stern of the watercraft, and a third wire rope having one end connected to a third edge portion of the water pool diametrically opposite an edge portion where the bow holding apparatus is disposed, the other end of the third wire rope being adapted to be connected to the center of the stern of the watercraft. It is further preferable that the first, second and third wire ropes each have two hooks at the one end and the opposite end thereof, and means for adjusting the length of the wire rope.

With the wire ropes thus arranged, the stern of the watercraft is anchored in position against lateral oscillation about the bow being held in the bow holding apparatus. The wire ropes permit vertical movement of the stern during thrust measurement operation.

BRIEF DESCRIPTION OF THE DRAWINGS

A preferred embodiment of the present invention will hereinafter be described in detail, by way of example only, with reference to the accompanying drawings, in which.

DETAILED DESCRIPTION OF THE PREFERRED EMBODIMENT

Figure 1:
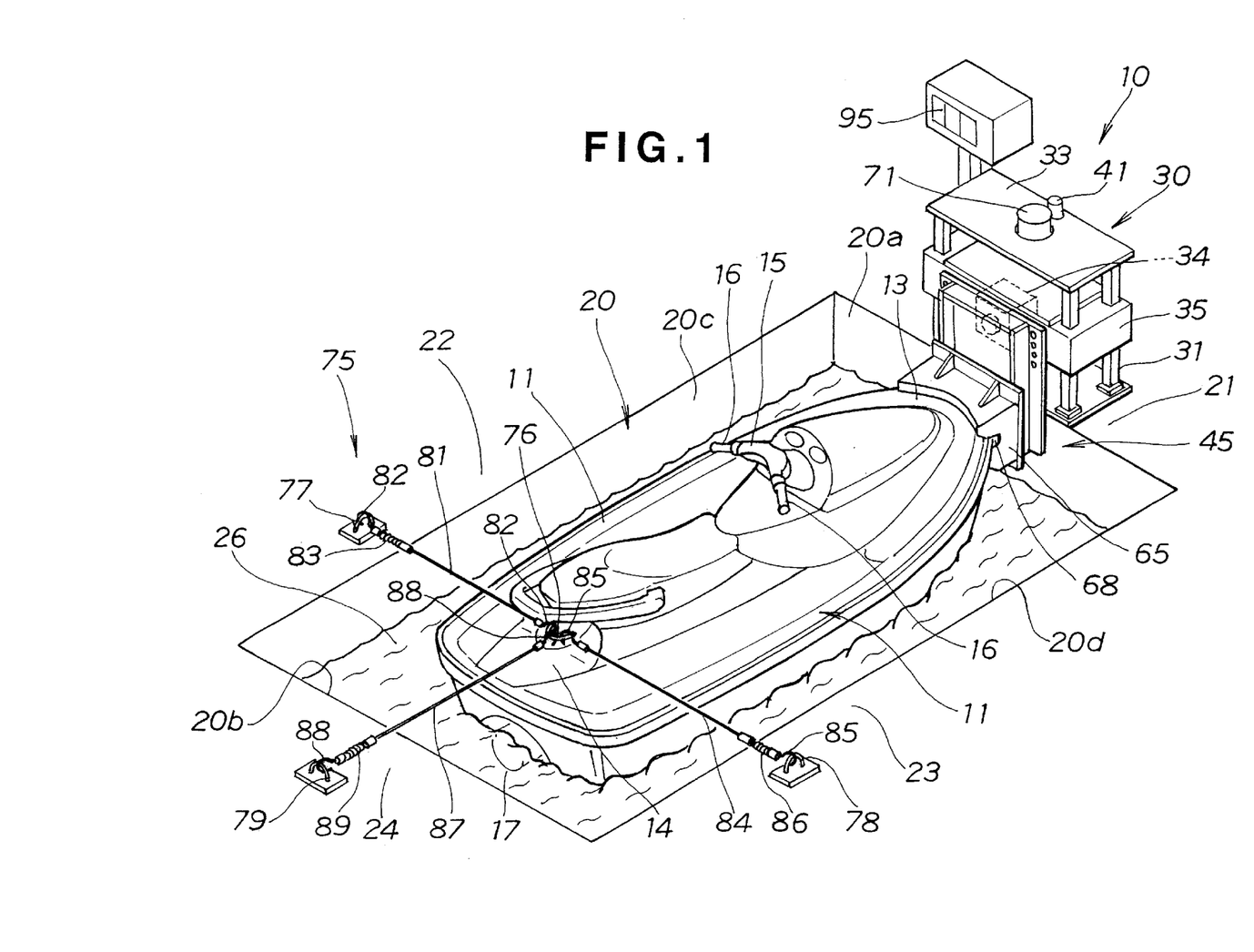
FIG. 1 is a perspective view of a thrust measurement system according to an embodiment of the present invention.

Referring now to the drawings and FIG. 1 in particular, there is shown a thrust measurement system 10 for watercrafts (small planing watercrafts, in particular) according to an embodiment of the present invention. The thrust measurement system 10 generally comprises a water pool 20 of a rectangular configuration for receiving therein a small planing watercraft 11 in a floating condition, a bow holding apparatus 30 disposed on a front edge portion 21 of the rectangular water pool 20 for holding a bow 13 of the small planing watercraft (hereinafter referred to, for brevity, as "watercraft") 11 during thrust measurement operation, a thrust measurement device 34 mounted or assembled in the bow holding apparatus 30 for measuring a thrust of the watercraft 11, an anchoring means 75 spanning between a hull (stern 14 in the illustrated embodiment) of the watercraft 11 and remaining edge portions (a left side edge portion 22, a right side edge portion 23 and a rear edge portion 24) of the water pool 20 for anchoring the watercraft 11 in position against lateral swinging movement about the bow 13, and a display unit 95 for indicating thrust data measured by the thrust measurement device 34.

The thrust measurement device 34 preferably comprises a load cell which is designed to measure an applied load or thrust by a change in its properties, such as a change in resistance (strain-gage load cell), pressure (hydraulic load cell), etc. The thrust measurement device 34 has a probe 34a against which a load or thrust is applied. When the thrust measurement device 34 is comprised of a hydraulic load cell, the probe 34a is formed by a piston.

The water pool 20 has a hollow rectangular space open upward and defined by a rectangular bottom wall 25, front and rear walls 20a and 20b extending vertically upward from opposite end edges of the rectangular bottom wall 25 (FIG. 4), and left and right side walls 20c and 20d extending vertically upward from opposite side edges of the rectangular bottom wall 25. The water pool 20 holds therein an appropriate quantity of water 26. An upper opening of the water pool 20 has a size sufficiently larger than that of the watercraft 11 so that it can receive or accommodate the watercraft 11 in a floating condition.

Figure 2:
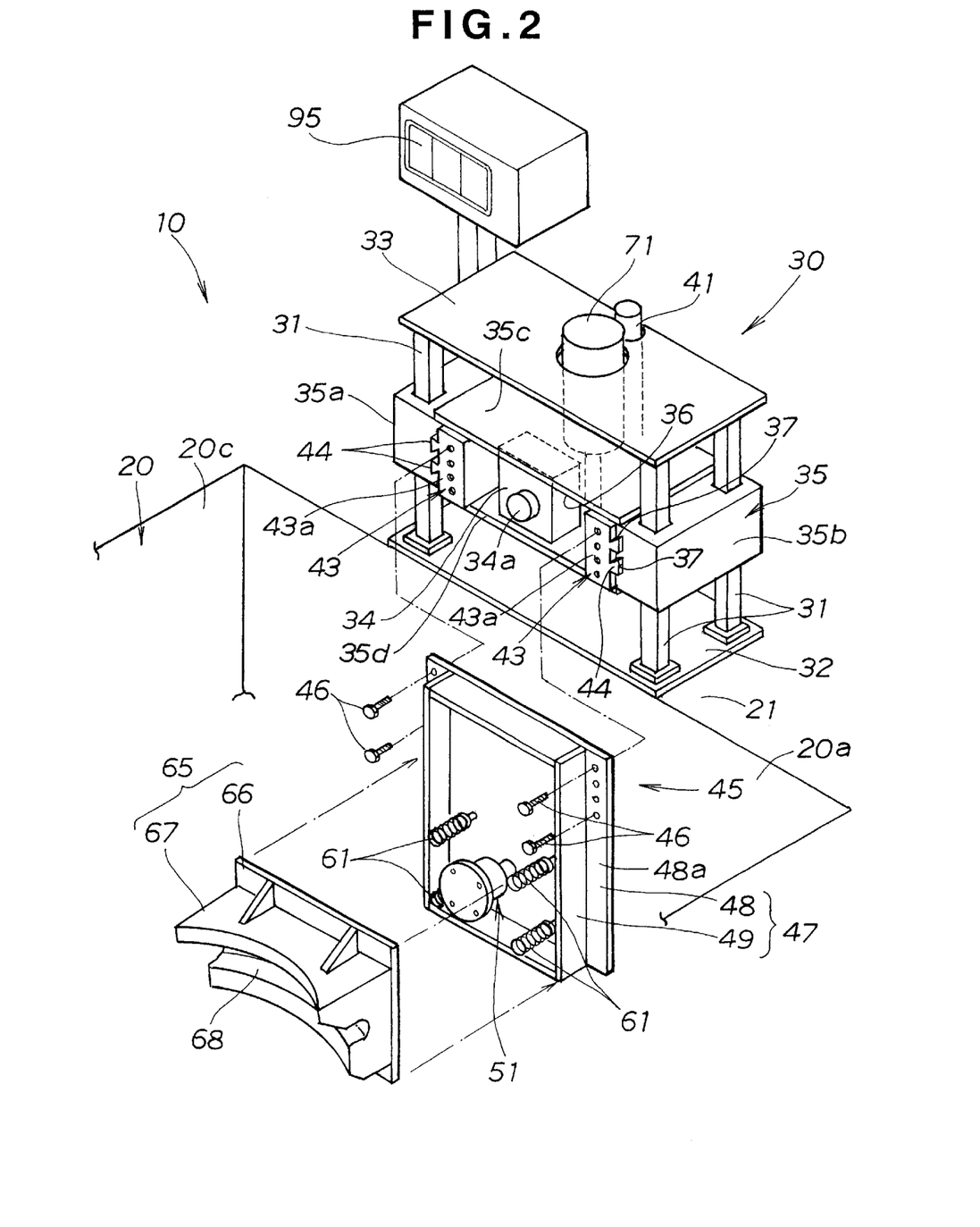
FIG. 2 is an exploded perspective view of a portion of the thrust measurement system including a bow holding apparatus and a thrust measurement device built in the bow holding apparatus.

As shown in FIG. 2, the bow holding apparatus 30 includes four support posts or columns 31 (three being shown), a carrier member 35 slidably mounted on the columns 31 for vertical movement along the columns 31, a cylinder actuator 41 operative to move the carrier member 35 upward and downward along the support columns 31, a pair of laterally spaced slide members 43, 43 slidably mounted on the carrier member 35 for horizontal reciprocating movement in a direction toward and away from the water pool 20, a bow holding means or mechanism 45 constructed to hold the bow 13 of the watercraft 11 while allowing movement of the bow 13 in all directions relative to a thrust axis, the bow holding mechanism 45 being mounted to the slide members 43, 43 for movement in unison with the slide members 43, 43 for thrusting the probe 34a of the thrust measurement device 34, and a balancing device or balancer 71 that counterbalances to the weights of the bow holding mechanism 45, thrust measurement device 34, slide members 43, 43 and carrier member 35. The thrust measurement device 34 is fixedly mounted or carried on the carrier member 35. The thrust axis is formed by the axis of the probe 34.

The support columns 31 stand upright from four corner portions of a rectangular base plate 32 which is secured to the front edge portion 21 of the water pool 20. A rectangular top plate 33 is attached to upper ends of the respective support columns 31. The carrier member 35 is normally disposed centrally between the base plate 32 and the top plate 33. The carrier member 35 comprises a hollow rectangular frame formed jointly by two rectangular end blocks 35a and 35b each mounted slidably on two adjacent ones of the support columns 31, and upper and lower horizontal plates 35c and 35d extending between the end blocks 35a, 35b so as to define, together with the end blocks 35a, 35b, a hollow rectangular space 36. Each of the end blocks 35a, 35b has a pair of vertically spaced guide grooves 37 extending horizontally in a direction parallel to a longitudinal axis of the rectangular water pool 20. The guide grooves 37 have a dovetail shape and open into the hollow rectangular space 36 of the carrier member 35. The thrust measurement device 34 is disposed centrally between the slide members 43, 43 within the hollow rectangular space 36 and firmly secured in position against movement relative to the carrier member 35.

Each of the slide members 43, 43 has a pair of vertically spaced guide rails 44, 44 of a dovetail configuration slidably fitted in the guide grooves 37, 37 of a respective one of the end blocks 35a, 35b, so that the slide members 43 are movable in a horizontal plane toward and away from the water pool 20.

The bow holding mechanism 45 is essentially comprised of a vertically disposed thrust board 47 firmly connected at an upper end portion thereof to the slide members 43, 43 by means of screws 46, and a bow hold member 65 designed for holding therein the bow 13 of the watercraft 11, and a ball joint 51 articulately interconnecting the bow hold member 65 and a lower part of the thrust board 47.

Figure 3:
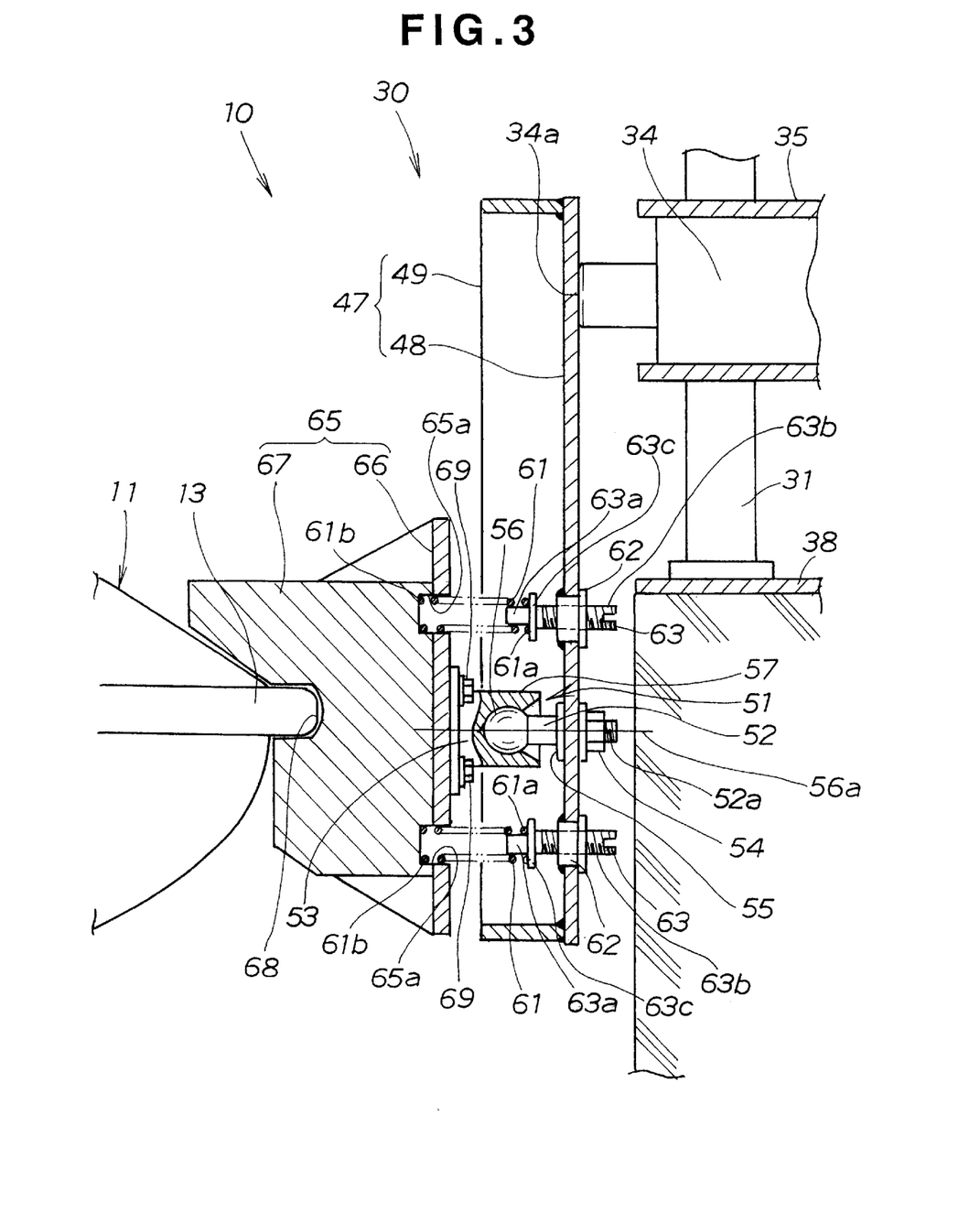
FIG. 3 is a vertical cross-sectional view showing a part of the bow holding apparatus.

The thrust board 47 includes a rectangular plate 48 forming a body of the thrust board 47, and a reinforcement frame 49 of a hollow rectangular shape provided on a front surface 48a of the plate 48 for reinforcing the plate (thrust board body) 48. The thrust board 47 has an upper end portion bolted to the slide members 43, 43, A back surface of the plate 48 is held in contact with the probe 34a of the thrust measurement device 34, as shown in FIG. 3.

The thrust board 47 and the bow hold member 65 are pivotally connected by the ball joint 51, and four compression coil springs 61 are interposed between the thrust board 47 and the bow hold member 65. The compression coil springs 61 are arranged at regular intervals around the axis 56a (FIG. 3) of the ball joint 51 such that two compression coil springs 61 are disposed on each of the upper and lower sides of the ball joint axis 56a.

The bow hold member 65 includes a vertically disposed support plate 66 and a holder body 67 attached to a front surface of the support plate 66. The holder body 67 has a recessed portion 68 formed in a front surface thereof. The recessed portion 68 has a profile or configuration complementary in shape with the profile of the bow 13 of the watercraft 11, so that the bow 13 of the watercraft 11 can be snugly received in the recessed portion 68 of the bow hold member 65.

Figure 4:
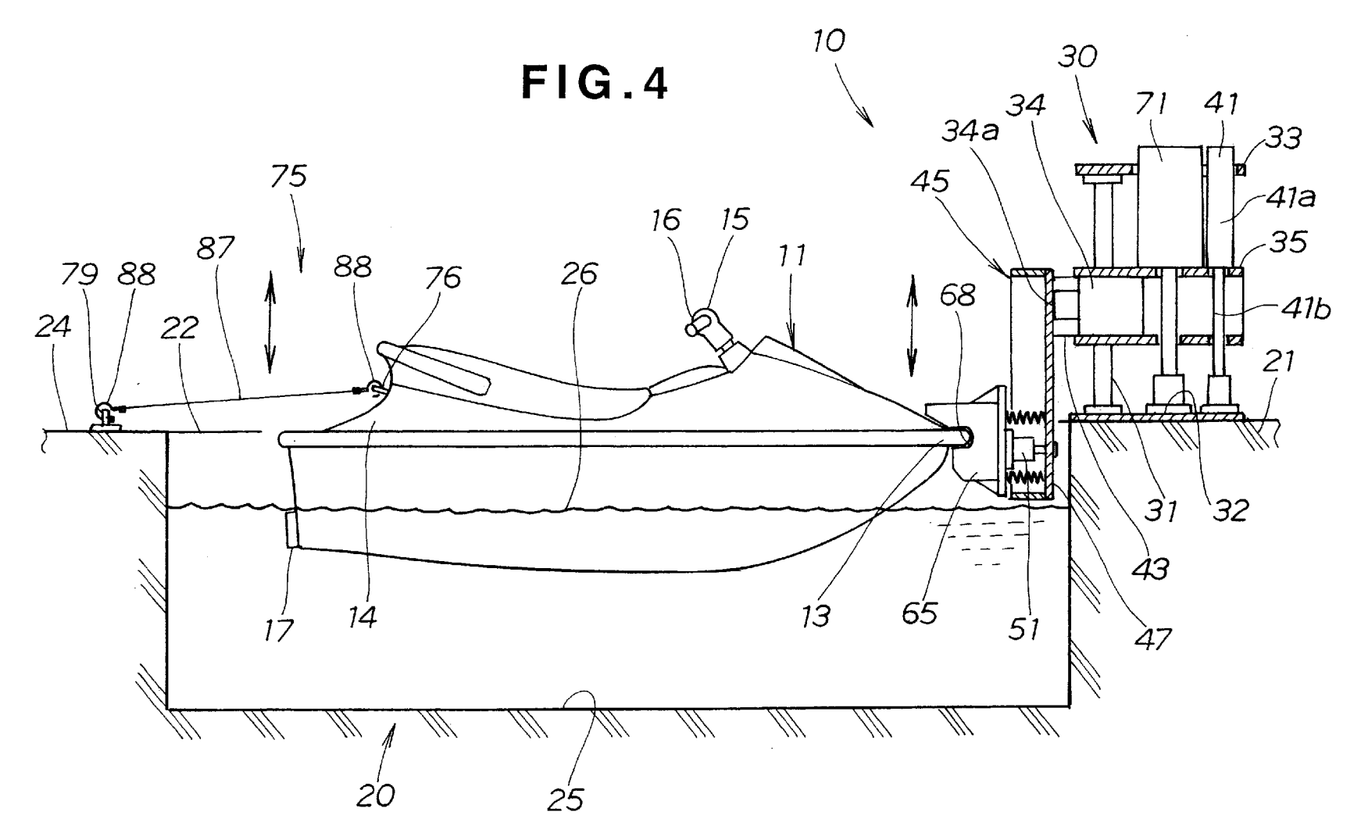
FIG. 4 is a diagrammatical side view, partly in cross section, of the thrust measurement system showing a small planing watercraft set in a measurement position inside a water pool.

As shown in FIG. 4, the cylinder actuator 41 is disposed vertically at a position behind both the thrust measurement device 34 and the balancing device 71. The cylinder actuator 41 has a cylinder body 41a connected to the upper plate 35c of the carrier member 35 and a piston rod 41b connected to the base plate 32 of the bow holding apparatus 30. With this arrangement, when the cylinder actuator 41 operates to extend its piston rod 41b, the carrier member 35 moves upward along the support columns 31. In this instance, since the bow holding mechanism 45 is connected to the carrier member 31 via the slide members 43, the bow holding mechanism 45 also moves upward together with the carrier member 35. Conversely, when the cylinder actuator 41 operates to retract its piston rod 41b, the carrier member 35 moves downward along the support columns 31. In this instance, the bow holding mechanism 45 moves downward together with the carrier member 35 because the carrier member 35 and the bow holding mechanism 45 are connected together via the slide members 43. Thus, by properly adjusting the forward or backward stroke of the piston rod 41b of the cylinder actuator 41, it is possible to place the bow holding member 65 of the bow holding mechanism 45 in a desired vertical position.

The balancing device 71 is disposed between the thrust measurement device 43 and the cylinder actuator 41. The balancing device 71 is connected to the carrier member 35 so as to cancel out or counterbalance the weights of the bow holding mechanism 45, thrust measurement device 34, slide members 43 and carrier member 35. By thus providing the balancing device 71, the bow holding mechanism 45, thrust measurement device 34, slide members 43 and carrier member 35 together form a floating structure that can move freely in a vertical plane.

Referring back to FIG. 1, the anchoring means 75 includes a left wire rope 81 having hooks 82, 82 at opposite ends thereof, a right wire rope 84 having hooks 85, 85 at opposite ends thereof, and a rear wire rope 87 having hooks 88, 88 at opposite ends thereof. The hook 82 at one end of the left wire rope 81 is hooked on an anchor ring 77 provided at the left side edge portion 22 of the water pool 20, and the hook 82 at the other end of the left wire rope 81 is hooked on an anchor ring 76 provided at the center of the width of the stern 14. Similarly, the hook 85 at one end of the right wire rope 84 is hooked on an anchor ring 78 provided at the right side edge portion 23 of the water pool 20, and the hook 85 at the other end of the right wire rope 84 is hooked on the anchor ring 76 of the watercraft 11. The hook 88 at one end of the rear wire rope 87 is hooked on an anchor ring 79 provided at the rear edge portion 24 of the water pool 20, and the hook 88 at the other end of the rear wire rope 87 is hooked on the anchor ring 76 of the watercraft 11. The left, right and rear wire ropes 81, 84, 87 each have a means for adjusting the length of the respective wire rope 81, 84, 87. The rope length adjusting means may be a turnbuckle 83, 86, and 89 that can adjust the length of each wire rope within a certain range of distance.

The left and right wire ropes 81, 84 have substantially the same length, and the length of these wire ropes 81, 84 is set such that, when the left and right wire ropes 81, 84 are hooked at opposite ends on the anchor rings 76, 77, 78 with the bow 13 of the watercraft 11 being received in the recessed portion 68 of the bow hold member 65, each wire rope 81, 84 extends substantially straight without sagging between the anchor ring 76 on the watercraft 11 and a corresponding one of the anchor rings 77, 78 on the pool side. By thus setting the lengths of the left and right wire ropes 81, 84, lateral movement or oscillation of the stern 14 does not occur.

The length of the rear wire rope 87 is set to be somewhat longer than the distance between the anchor ring 79 of the pool side and the anchor ring 76 on the stern 14 so that when the wire rope 87 slightly sags down when hooked at opposite ends on the anchor rings 76, 79. This permits forward movement of the watercraft 11 when the watercraft 11 is driven forward, which is due for pushing or thrusting the probe 34a (FIG. 2) of the thrust measurement device 34 via the thrust board 47 (FIG. 2) of the bow holding mechanism 45.

Additionally, the wire ropes 81, 84, 87 that are hooked on the anchor rings 77, 78, 79 at the pool edge portions and the anchor ring 76 at the center of the stern 14 of the watercraft 11 permit vertical movement of the stern 14 to some extent.

As shown in FIG. 3, the ball joint 51 is composed of a first or male member 52 having a ball 56 at an end thereof, and a second or female member 53 having a socket 57 at an end thereof. The ball 56 and the socket 57 are coupled together so that relative movement between the male and female members 52, 53 is permitted within a certain angle in all planes passing through a line. The male member 52 is secured to the plate 48 of the thrust board 47 by means of a threaded faster which is composed of an externally threaded shank portion 52a of the male member 52 and a nut 54 threaded around the shank portion 52a. The male member 52 has an annular flange 55 disposed on the opposite side of the nut 54 across the plate 48 of the thrust board 47. The female member 53 is secured by screws 69 to the support plate 66 of the bow hold member 65.

The compression coil springs 61 interposed between the thrust board 47 and the bow hold member 65 are stably held in position against displacement by and between adjustable spring retainers 63 and recessed portions 65a formed in the bow hold member 65. The adjustable spring retainers 63 each comprise a stepped round bar having a thread-free small-diameter portion 63a and a threaded large-diameter portion 63b separated from each other by an annular flange 63c. The annular flange 63c supports one end 61a (right end in FIG. 3) of the compression coil spring 61 with the thread-free small-diameter portion 63a of the adjustable spring retainer 63 received in an internal space of the compression coil spring 61. The threaded large-diameter portion 63b is threaded through an internally threaded bush 62 firmly secured by welding to the plate 48 of the thrust board 47. The opposite end 61b (left end in FIG. 3) of the compression coil spring 61 is held in abutment with a bottom surface of the recessed portion 65a of the bow hold member 65. The internally threaded bush 62 forms an internally threaded portion of the thrust board 47.

With this arrangement, when a movement of the watercraft 11 occurring during thrust measurement operation causes the bow hold member 65 to pivot or turn upward about the ball 56 of the ball joint 51, the upper two compression coil springs 61 are axially compressed while the lower two compression coil springs 61 are allowed to expand. Conversely, when a movement of the watercraft 11 occurring during thrust measurement operation causes the bow hold member 65 to turn or pivot downward about the ball 56 of the ball joint 51, the upper two compression coil springs 61 are allowed to expand while the lower two compression coil springs 61 are axially compressed.

The initial position of the bow hold member 65 relative to the thrust board 47 can be changed by properly adjusting the amount of preload applied to the necessary one or ones of the compression coil springs 61 by axially displacing the corresponding one or ones of the adjustable spring retainers 63 relative to the bush 62. For instance, when the bow support member 65 is to be inclined upward relative to the thrust board 47, two adjustable spring retainers 63 that are positioned below the ball joint 51 are turned in a direction to cause forward movement of the same spring retainers 64 toward the bow support member 65. Conversely, when the bow support member 65 is to be inclined downwardly relative to the thrust board 47, two adjustable spring retainers 63 that are positioned above the ball joint 51 are turned in a direction to cause forward movement of the same spring retainers 64 toward the bow support member 65. Similarly, when the bow hold member 65 is to be tilted leftward or rightward relative to the bow hold member 65, two adjustable spring retainers 63 that are disposed on a right side or a left side of the ball joint 51 are turned in a direction to cause forward movement of the same spring retainers 63 toward the bow support member 65.

FIG. 4 is a diagrammatical vertical cross-sectional view of the thrust measurement system 10 of the present invention, showing the condition in which the watercraft 11 is in a thrust measurement position with its bow 13 and stern 14 held by the bow holding apparatus 30 and the anchoring means 75, respectively.

When the watercraft 11 is in the thrust measurement position of FIG. 4, the bow 13 of the watercraft 11 is fitted or snugly received in the recessed portion 68 of the bow hold member 65 of the bow hold apparatus 30, and the stern 14 of the watercraft 11 is stably held or anchored by the left, right and rear wire ropes (only the rear wire rope 87 being shown) of the anchoring means 75 spanning between the corresponding edge portions (only the rear end edge portion 22 being shown) of the water pool 20 and the anchor ring 76 at the center of the stern 14 of the watercraft 11.

For setting the watercraft 11 in the thrust measurement position, the bow 13 of the watercraft 11 is held in the recessed portion 68 of the bow hold member 65 and after that the stern 14 of the watercraft 11 is anchored by the wire ropes 81, 84, 87 (FIG. 1). In this instance, since the bow holding mechanism 45 and the carrier member 35 are connected together via the slide members 43, it is readily possible to place the recessed portion 68 of the bow hold member 65 in a position substantially the same in level or height as the bow 13 of the watercraft 11 merely by moving the carrier member 35 upward or downward along the support columns 31 through operation of the cylinder actuator 41.

During thrust measurement operation, the watercraft 11 undergoes pitching and rolling movements, which necessarily involve vertical movement of the bow 13 and stern 14 of the watercraft 11. In order to accommodate vertical movement of the bow 13, the bow holding mechanism 45 is required to move up and down in synchronism with vertical movement of the bow 13 which is received in the recessed portion 68 of the bow hold member 65. According to the present invention, since the balancing device 71 provided in the bow holding apparatus 30 counterbalances to the weights of the bow holding mechanism 45, thrust measurement device 34, slide members 43 and carrier member 35, these components 45, 34, 43 and 35 jointly form a floating structure that can move freely in a vertical plane. By the floating structure thus provided, free vertical movement of the bow 13 during thrust measurement operation is permitted.

Vertical movement of the stern 14 is also permitted to some extent because the left, right and rear wire ropes 81, 84, 87 spanning between the anchor rings 77, 78, 79 of the corresponding edge portions 22, 23, 24 of the water pool 20 and the anchor ring 76 at the center of the stern 14 do not hinder such vertical movement of the stern 14. On the other hand, the wire ropes 81, 84, 87 anchor the stern 14 of the watercraft 11 in position against lateral oscillation so that the watercraft 11 as a whole is prevented from swinging left and right about the bow 13.

By the bow holding apparatus 30 and the anchoring means 75 used in combination, the thrust measurement system 10 is able to keep the watercraft 11 stably in the thrust measurement position while allowing the watercraft 11 to take various postures which may occur during thrust measurement operation due to, for example, pitching, rolling, tilting and uprising of the watercraft 11. The longitudinal axis of the watercraft 11 is always kept substantially in the same direction as the thrust axis. This ensures that the thrust measurement can be achieved reliably and accurately.

Operation of the thrust measurement system 10 will be described in greater detail with reference to FIGS. 5A and 5B, FIGS. 6A and 6B and FIG. 7.

Figure 5A:
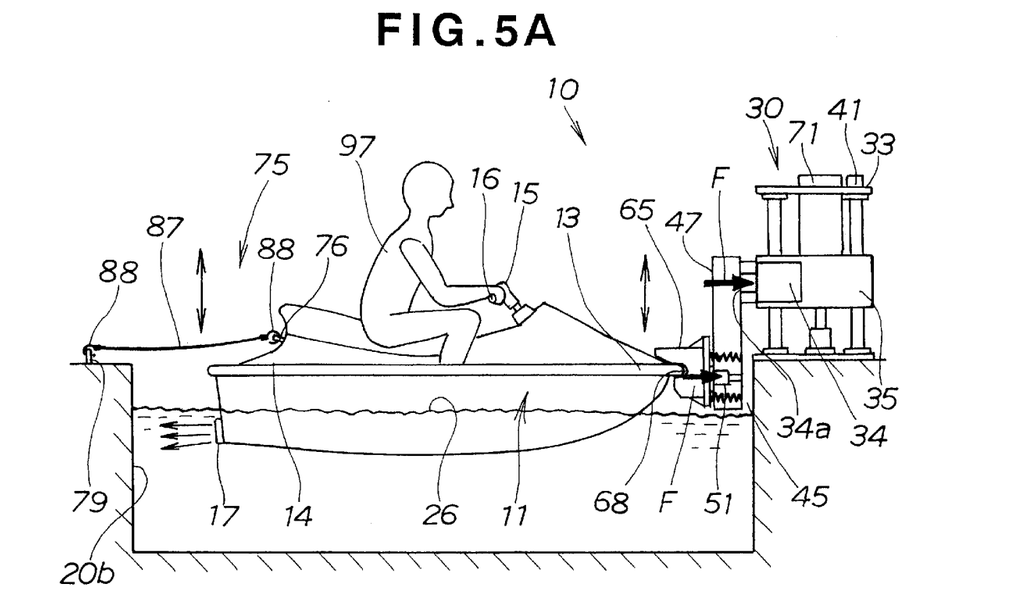
FIG. 5A is a diagrammatical side view, partly in cross section, of the thrust measurement system, showing one mode of operation in which the small planing watercraft is driven to run in a straightforward direction.
Figure 5B:
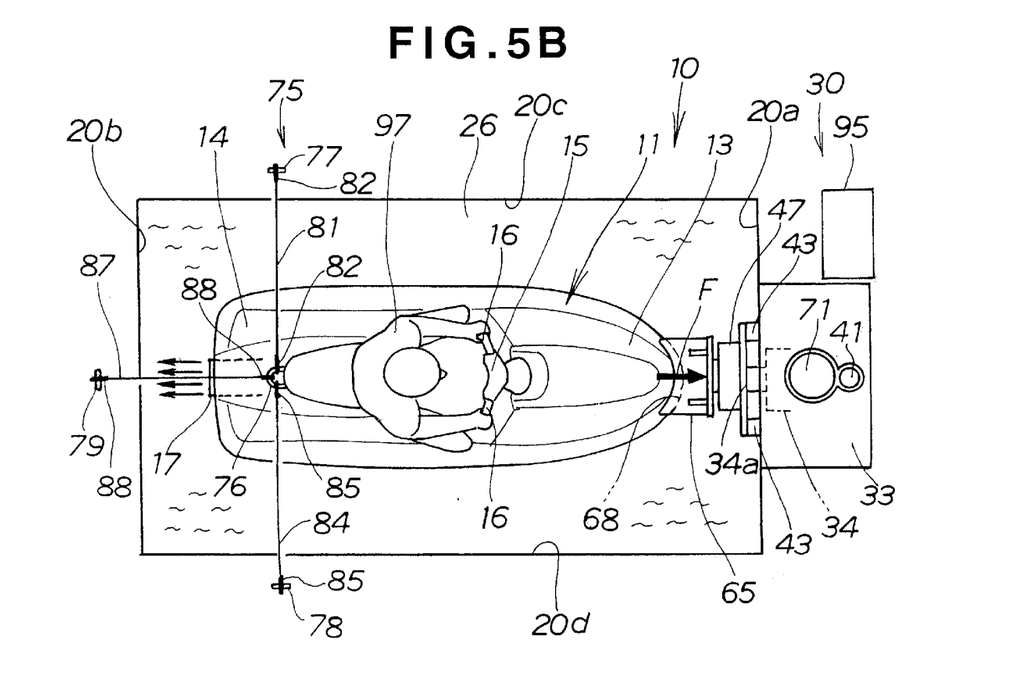
FIG. 5B is a diagrammatical plan view of FIG. 5A.

FIG. 5A is a diagrammatical side view, partly in cross section, of the thrust measurement system 10, showing one mode of operation in which a small planing watercraft 11 is in a normal panning condition, and FIG. 5B is a plan view of FIG. 5A. For such thrust measurement operation, the watercraft 11 is first placed in the water pool 20 with its bow 13 directed toward the bow holding apparatus 30. In this instance, no operator is riding on the watercraft 11. Then, the cylinder actuator 41 of the bow holding apparatus 30 is driven to move the carrier member 35 upward or downward to the extent that the recessed portion 68 of the bow hold member 65 lies in substantially the same vertical level as the bow 13 of the watercraft 11. Subsequently, the bow 13 of the watercraft 11 is fitted or snugly received in the recessed portion 68 of the bow hold member 65. The bow 13 of the watercraft 11 is thus held in position by the bow holding mechanism 45.

Thereafter, the stern 14 of the watercraft 11 is anchored by the left, right and rear wire ropes 81, 84 and 87 each spanning between the anchor ring 77, 78 or 79 of the corresponding edge portion of the water pool 20 and the anchor ring 76 of the stern 14. In this instance, the rearwire rope 87 spanning between the anchor rings 76 and 79 slightly sags down so that the watercraft 11, when driven, is allowed to move forward to thereby force or thrust the probe 34a of the thrust measurement device 34 via forward movement of the bow holding mechanism 45. By thus anchoring the stern 14 with the wire ropes 81, 84, 87, the watercraft 11 is stably held in a measurement position in the thrust measurement system 10.

Then, an operator 97 rides on the watercraft 11 and starts a jet pump (not shown) of the watercraft 11 whereupon water is pumped up from the bottom of the watercraft 11 and a pressurized stream of water is ejected backward from a steering nozzle 17 of the watercraft 11 to thereby propel the watercraft 11 with a thrust.

The pressurized stream of water ejected from the steering nozzle 17 strikes on the rear wall 20b of the water pool 20, then branches off in leftward and rightward directions, and subsequently flows back along the left and right-side walls 20c, 20d (FIG. 5B) toward the front wall 20a of the water pool 20. Water currents thus created cause the pool water surface to become wavy or heaving, and the watercraft 11 floating on the pool water surface moves to drift in synchronism with heaving of the pool water surface.

In this instance, free rise and fall of the bow 13 of the watercraft 11 are not hindered because the bow hold member 65 of the bow holding mechanism 45 is formed as an integral part of the floating structure that can move freely in a vertical plane. At the same time, free rise and fall of the stern 14 are also permitted because the left, right and rear wire ropes 81, 84 and 87 each spanning between a corresponding one of the pool edge portions and the stern 14 do not hinder such vertical movement of the stern 14. The normal planing condition of the watercraft 11 can thus be maintained.

Since the watercraft 11 is thrust forward with its bow 13 held in the bow hold member 65, as shown in FIGS. 5A and 5B, the stern 14 of the watercraft 11 tends to oscillate or swing in a lateral direction. However, lateral swinging movement of the stern 14 does not occur because, as shown in FIG. 6B, the stern 14 of the watercraft 11 is anchored in position against lateral movement by means of the left, right and rear wire ropes 81, 84 and 87 each spanning between the anchor ring 77, 78 or 79 of the corresponding pool edge portion and the anchor ring 76 on the stern 14 of the watercraft 11.

By thus anchoring the stern 14 of the watercraft 11, the thrust applied to move the watercraft 11 in the forward direction acts on the bow hold member 65 in a direction perpendicular to the plane of the support plate 66 (FIG. 3) of the bow hold member 65, as indicated by the arrow F shown in FIG. 5B. The thrust F is then transmitted via the ball joint (FIG. 5A) and the thrust board 47 to the slide members 43, whereby displacing the slide members 43 in a backward direction. Backward movement of the slide members 43 causes the thrust board 47 to push or thrust the probe 34a of the thrust measurement device 34. In this instance, the thrust F acts in the direction of the thrust axis of the probe 34a of the thrust measurement device 34. The thrust measurement device 34 measures an applied load or thrust by a change in its properties, such as a change in resistance (strain-gage load cell), pressure (hydraulic load cell), etc. A measured thrust value is concurrently indicated on a screen of the display unit 95 (FIG. 1).

Figure 6A:
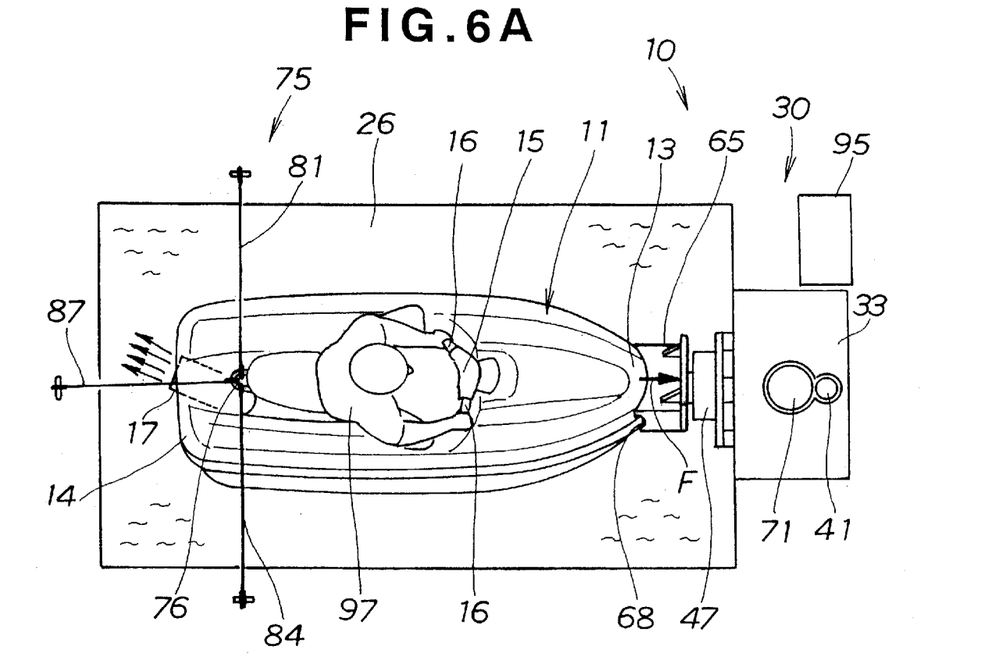
FIG. 6A is a view similar to FIG. 5B, but showing another mode of operation of the thrust measurement system in which the small planing watercraft is steered to make a left turn.
Figure 6B:
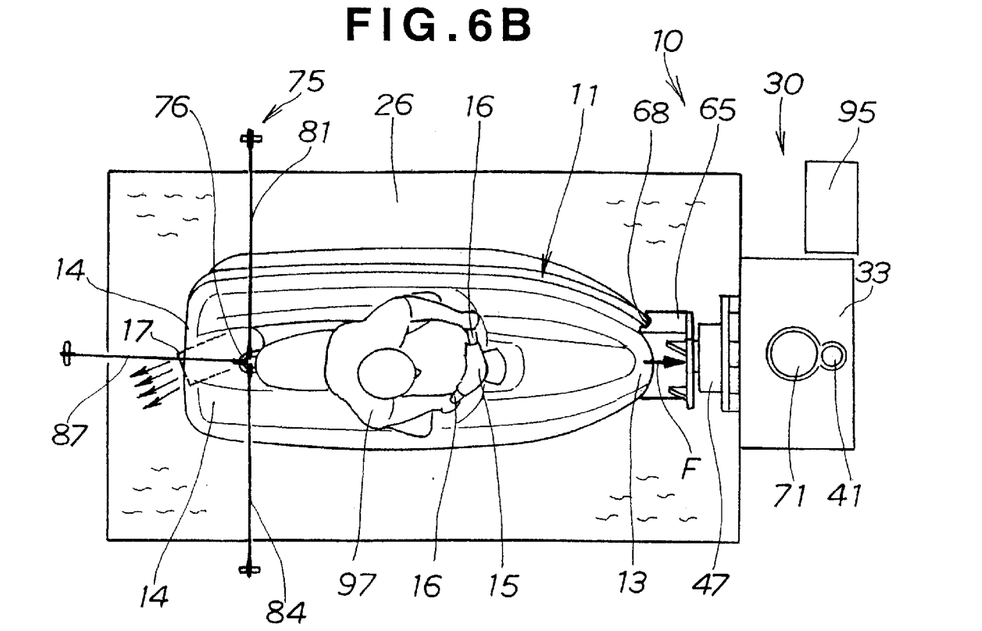
FIG. 6B is a view similar to FIG. 5B, but showing still another mode of operation in which the small planing watercraft is steered to make a right turn.

FIG. 6A shows another mode of operation of the thrust measurement system 10 in which the watercraft 11 is steered leftward (counterclockwise direction in FIG. 6A) to make a left turn. The operator 97 while gripping left and right grips 16 of a steering handle 15 turns the steering handle 16 leftward (counterclockwise direction in FIG. 6A) so that the steering nozzle 17 turns leftward (clockwise direction in FIG. 6A). Thus, a pressurized stream of water is ejected from the steering nozzle 17 obliquely leftward in a rearward direction of the watercraft 11, as indicated by the arrows in FIG. 6A.

Under such condition, the operator 97 tilts its body leftward to thereby put the weight thereof on its left foot side. This causes the watercraft 11 to tilt leftward and assume a left-turn position shown in FIG. 6A. Such leftward tilting of the watercraft 11 occurs smoothly without hindrance because the bow hold member 65 connected by the ball joint 51 (FIG. 2) to the thrust board 47 is pivotally movable in all directions relative to the thrust board 47, and the left, right and rear wire ropes 81, 84, 87 are hooked on the anchor ring 76 at the center of the width of the stern 14.

The watercraft 11, as it is in the left-turn position, tilts leftward, however, the longitudinal axis of the watercraft 11 remains substantially perpendicular to the plane of the thrust board 47. Accordingly, a thrust force F of the watercraft 11 acts substantially perpendicularly on the thrust board 47, as shown in FIG. 6A. That is, the thrust force F acts in the direction of the thrust axis of the probe 34a of the thrust measurement device 34. With this arrangement, thrust measurement can be achieved reliably and accurately even when the watercraft 11 is tilted leftward to make a right turn.

FIG. 6B shows still another mode of operation of the thrust measurement system 10 in which the watercraft 11 is steered rightward (clockwise direction in FIG. 6B) to make a right turn. The operator 97 while gripping the left and right grips 16 of the steering handle 15 turns the steering handle 16 rightward (clockwise direction in FIG. 6B) so that the steering nozzle 17 turns rightward (counterclockwise direction in FIG. 6B). Thus, a pressurized stream of water is ejected from the steering nozzle 17 obliquely rightward in a rearward direction of the watercraft 11, as indicated by the arrows shown in FIG. 6B.

Under such condition, the operator 97 tilts its body rightward to thereby put the weight thereof on its right foot side. This causes the watercraft 11 to tilt rightward and assume a right-turn position shown in FIG. 6B. Such rightward tilting of the watercraft 11 occurs smoothly without hindrance for the same reason as discussed above with reference to FIG. 6A. Since the longitudinal axis of the watercraft 11 remains perpendicular to the plane of the thrust board 47 regardless of the rightward tilting of the watercraft 11 as a whole, a thrust force F of the watercraft 11 acts on the thrust board 47 in a perpendicular direction of the latter, which is the direction of the thrust axis of the probe 34a of the thrust measurement device 34. With this arrangement, it is possible to conduct a thrust measurement of the rightly steered watercraft 11 in a stable and accurate manner.

Figure 7:
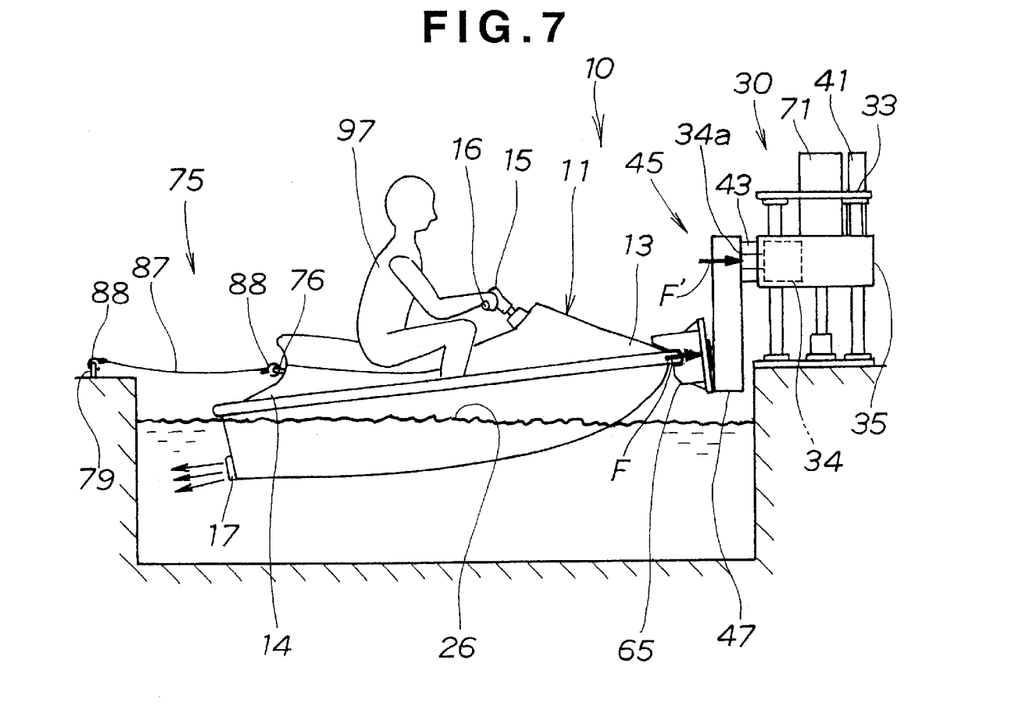
FIG. 7 is a view similar to FIG. 5A, but showing a further mode of operation in which the small planing watercraft is accelerated to take an elevated position with its stern sinking deeper and bow rising higher.

FIG. 7 shows a further mode of operation of the thrust measurement system 10 in which the watercraft 11 is accelerated to assume an uprising position.

When the watercraft 11 shown, for example, in FIG. 5A is accelerated, the stern 14 of the watercraft 11 sinks deeper into the water and the bow 13 rises higher from the water surface, as shown in FIG. 7. In this instance, rising of the bow 13 occurs smoothly without hindrance because the bow holding mechanism 34, thrust measurement device 34, slide members 43 and carrier member 35 together form a floating structure that can move freely in a vertical plane due to the action of the balancing device 71. At the same time, sinking of the stern is not hindered because the left, right and rear wire ropes (only the rear wire rope 87 being shown) each spanning between the corresponding pool edge portions and the center of the stern 14 permit such sinking movement of the stern 14.

The bow hold member 65, when thrust with a thrust force F of the watercraft 11, inclines backward away from the thrust board 47. The thrust force F is transmitted from the bow hold member 65 through the ball joint 51 to the thrust board 47. Since the thrust board 47 is always disposed in a vertical plane regardless of the posture of the bow hold member 65, a thrust force F' applied from the thrust board 47 to the probe 34a of the thrust measurement device 34 acts always in a direction parallel to the thrust axis of the probe 34a of the thrust measurement device 71. Accordingly, thrust measurement can be achieved reliably with high accuracy even when the watercraft 11 takes an uprising position, such as shown in FIG. 7.

As thus for explained, the thrust measurement system for watercrafts according to the present invention includes a water pool which can receive or hold therein a watercraft in a floating condition. A bow holding apparatus disposed on an edge of the water pool is able to hold therein a bow of the watercraft during thrust measurement operation. A thrust measurement device, such as a load cell, is mounted in the bow holding apparatus. An anchoring means spans between the edge of the water pool and a hull of the watercraft so as to anchor the watercraft in position against lateral swinging or oscillating movement about the bow. With the thrust measurement system thus arranged, it is possible to measure the thrust of a propulsion unit such as jet pump under the condition that the propulsion unit is installed in the watercraft.

The bow holding apparatus includes a carrier member slidably mounted on a plurality of support columns for vertical movement along the support columns, the carrier member carrying thereon the thrust measurement device. A cylinder actuator is operatively connected with the carrier member for moving the carrier member upward or downward along the support columns. A slide member is slidably mounted on the carrier member for horizontal reciprocating movement in a direction toward and away from the water pool. A bow holding mechanism for holding therein the bow of the watercraft is connected to the slide member and held in contact with a probe of the thrust measurement device. The weights of the bow holding mechanism, thrust measurement device, slide member and carrier member are canceled out or counterbalanced so that the bow holding mechanism, thrust measurement device, slide member and carrier member together form a floating structure that can move freely in a vertical plane.

By virtue of the floating structure, the bow of the stern is permitted to freely move up and down during thrust measurement operation when the watercraft undergoes, for example, pitching or rolling movement in synchronism with heaving of the pool water surface. Free rise and fall of the stern of the watercraft is also permitted because the anchoring means comprises three wire ropes spanning between three mutually perpendicularly arranged edge portions of the water pool and a central portion of the stern of the watercraft do not hinder such free vertical movement of the stern. The bow holding mechanism preferably has a bow hold member having a recessed portion of a configuration snugly receptive of the bow of the watercraft, a vertically disposed thrust board firmly connected to the slide member and held in contact with the probe of the thrust measurement device so that a movement of the slide member in a direction away from the water pool causes the thrust board to press the probe of the thrust measurement device, and a ball joint articulately interconnecting the bow hold member and the thrust board. The bow hold member can move in all directions relative to the thrust board, so that the watercraft while being subjected to a thrust measurement is permitted to assume a tilted position or an uprising position that may occur when the watercraft is steered or accelerated.

Obviously, various minor changes and modifications are possible in the light of the above teaching. It is to be understood that within the scope of the appended claims the present invention may be practiced otherwise than as specifically described.

The present disclosure relates to the subject matter of Japanese Patent Application No. 2002-176888, filed Jun. 18, 2002, the disclosure of which is expressly incorporated herein by reference in its entirety.

What is claimed is:

1. A thrust measurement system for watercrafts, comprising:

a water pool, said water pool being adapted to receive for a watercraft in a floating condition;

a bow holding apparatus, said bow holding apparatus being disposed on an edge of the water pool and being adapted to hold a bow of the watercraft during a thrust measurement operation;

a thrust measurement device, said thrust measurement device being mounted in the bow holding apparatus and being adapted to measure a thrust of the watercraft; and, anchoring means extending between the edge of the water pool and a hull of the watercraft for anchoring the watercraft against lateral swinging movement about the bow.

2. The thrust measurement system according to claim 1, wherein the bow holding apparatus includes:

a plurality of support columns;

a carrier member slidably mounted on the support columns for vertical movement along the support columns, the carrier member carrying thereon the thrust measurement device;

a cylinder actuator for moving the carrier member upward or downward along the support columns;

a slide member slidably mounted on the carrier member for horizontal reciprocating movement in a direction toward and away from the water pool;

a bow holding mechanism for holding therein the bow of the watercraft, the bow holding mechanism being connected to the slide member and held in contact with a probe of the thrust measurement device; and, a balancing device that counterbalances weights of the bow holding mechanism, thrust measurement device, slide member, and carrier member such that the bow holding mechanism, thrust measurement device, slide member and carrier member together form a floating structure that can move freely in a vertical plane.

3. The thrust measurement system according to claim 2, wherein the bow holding mechanism includes:

a bow hold member having a recessed portion of a configuration snugly receptive of the bow of the watercraft;

a vertically disposed thrust board connected to the slide member for movement in unison with the slide member and held in contact with a probe of the thrust measurement device such that a movement of the slide member in a direction away from the water pool causes the thrust board to push the probe of the thrust measurement device; and, a ball joint articulately interconnecting the bow hold member and the thrust board.

4. The thrust measurement system according to claim 3, wherein the bow holding mechanism further comprises a plurality of compression coil springs, said plurality of compression coil springs acting between the bow hold member and the thrust board and being arranged at regular intervals around an axis of the ball joint.

5. The thrust measurement system according to claim 4, wherein the bow holding mechanism further comprise a plurality of adjustable spring retainers, each of said plurality of adjustable spring retainers supporting one end of a respective one of the compression coil springs, the adjustable spring retainers being movably mounted on one of the bow hold member and the thrust board and separately movable in a direction to change a preload applied to the individual compression springs.

6. The thrust measurement system according to claim 5, wherein each of the adjustable spring retainers comprise a stepped round bar having a thread-free small-diameter portion, a threaded large-diameter portion, and an annular flange separating the small-diameter portion and the large-diameter portion, the annular flange supporting thereon one end of each compression coil spring with the thread-free small-diameter portion received in an internal space of the compression coil spring, and the threaded large-diameter portion being threaded through an internally threaded portion of the thrust board.

7. The thrust measurement system according to claim 6, wherein the bow hold member has a plurality of recessed portions arranged around the axis of the ball joint, each of said plurality of recessed portions receiving therein a second, opposite end of a respective one of the compression coil springs.

8. The thrust measurement system according to claim 1, wherein the anchoring means further comprises:

a first wire rope having a first end connected to a first edge portion of the water pool and a second, opposite end adapted to be connected to a central portion of a stern of the watercraft;

a second wire rope having a first end connected to a second edge portion of the water pool diametrically opposite the first edge portion and a second, opposite other end adapted to be connected to the central portion of the stern of the watercraft; and, a third wire rope having a first end connected to a third edge portion of the water pool diametrically opposite an edge portion where the bow holding apparatus is disposed and a second, opposite end of the third wire rope being adapted to be connected to the center of the stern of the watercraft.

9. The thrust measurement system according to claim 8, wherein each of the first, second, and third wire ropes have a hook at each of said first and second ends thereof, and means for adjusting a length of the wire rope.

\* \* \* \* \*

UNITED STATES PATENT AND TRADEMARK OFFICE
CERTIFICATE OF CORRECTION

PATENT NO. : 6,691,635 B2
DATED : February 17, 2004
INVENTOR(S) : Murakami et al.

It is certified that error appears in the above-identified patent and that said Letters Patent is hereby corrected as shown below:

Column 12,
Line 46, delete "for".

Signed and Sealed this

Twenty-seventh Day of April, 2004

JON W. DUDAS
*Acting Director of the United States Patent and Trademark Office*